Patented Nov. 28, 1922.

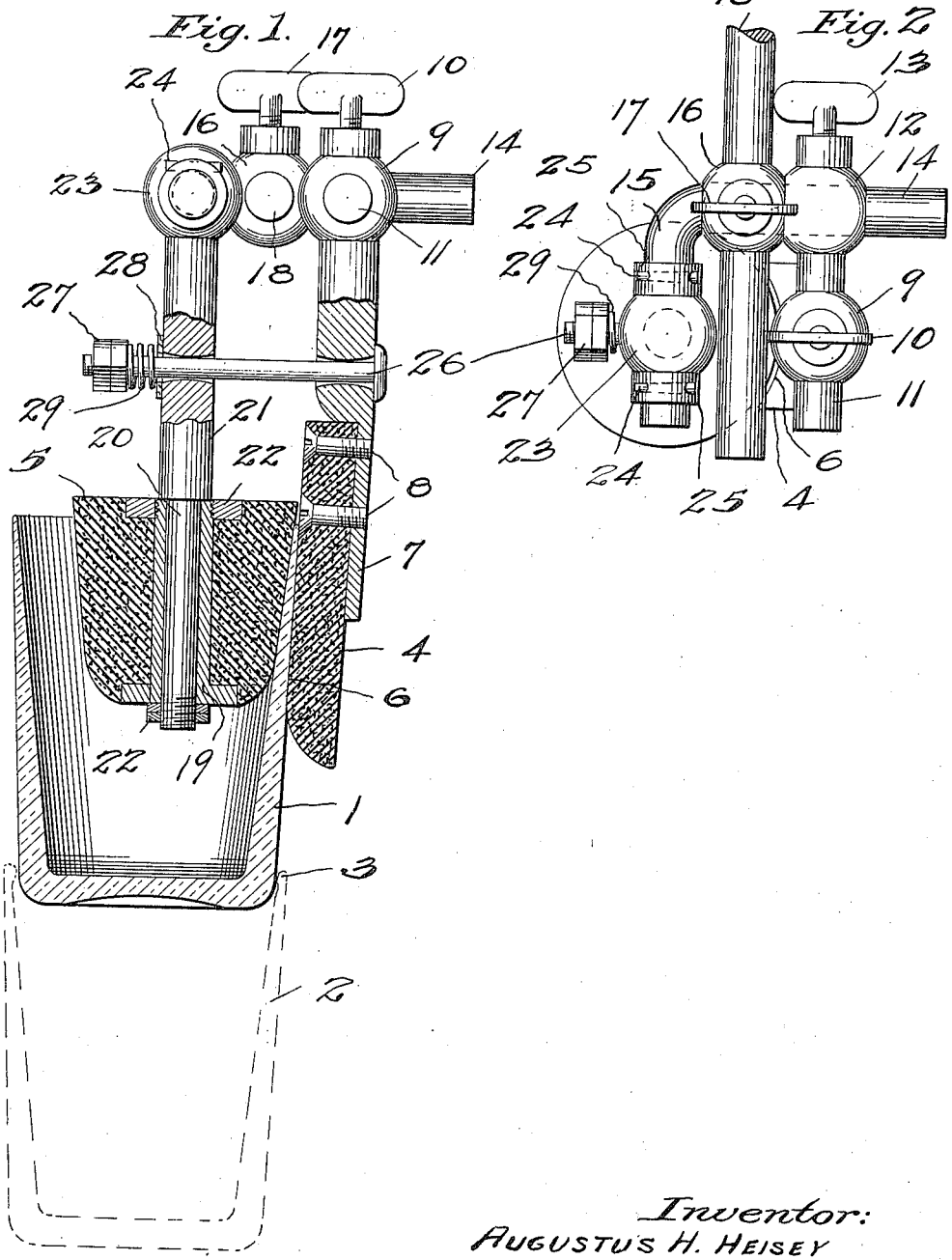

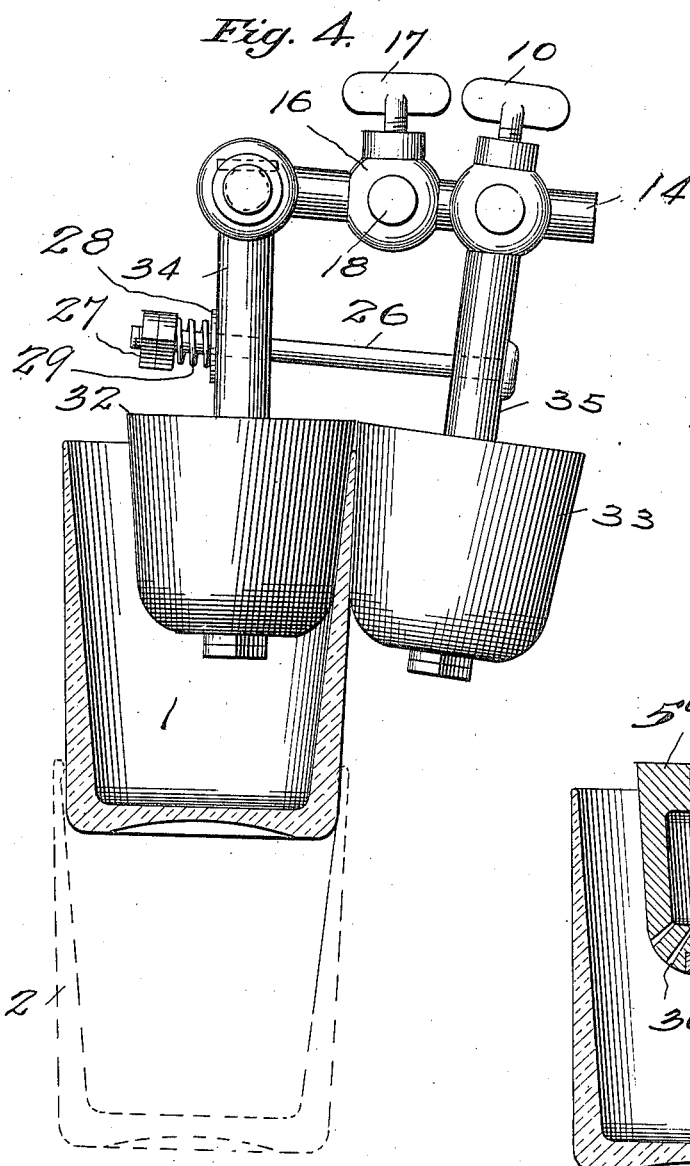

1,436,878

UNITED STATES PATENT OFFICE.

AUGUSTUS H. HEISEY, OF NEWARK, OHIO, ASSIGNOR TO A. H. HEISEY & COMPANY, OF NEWARK, OHIO.

GLASS-FINISHING MACHINE.

Application filed June 17, 1921. Serial No. 478,356.

*To all whom it may concern:*

Be it known that I, AUGUSTUS H. HEISEY, a citizen of the United States, residing at Newark, in the county of Licking and State of Ohio, have invented certain new and useful Improvements in Glass-Finishing Machines, of which the following is a specification.

The invention relates particularly to that class of machines for finishing cylinder glass ware, including tumblers and similar articles with open ends, for the purpose of thinning the material of the walls of the cylindrical article to a uniform thickness of predetermined dimensions and applying thereto a smooth and regular finish.

In the process of making the cylindrical article, such as a tumbler, vase, etc., the glass may be either stuck on an iron punty or glass end on said punty, or the glass is caught in a snap device or holder to retain the cylinder in position for re-heating the material of the end that is to be finished or thinned out. During this process the glass article is retained in the finishing machine and thereby revolved a number of times in one direction, and then revolved an equal number of times in the reverse direction. During this movement of the glass the device of my invention is applied to the open end of the cylinder for uniformly thinning its walls and edges, and the forward and reverse movement of the cylindrical article, while in a heated condition and being operated upon by the device of my invention, prevents the heated plastic material from running together, and insures a perfect, symmetrical article.

The manipulation of the glass cylinder and the action thereon by the device of my invention, insures the production of an acceptable and merchantable tumbler, vase, or similar article, and the machine forming the subject matter of my invention performs its functions with facility and accuracy.

With the above ends in view the invention consists in certain novel combinations and arrangements of parts in a finishing machine as will be hereinafter more fully described and claimed.

In the accompanying drawings I have illustrated several complete embodiments of my invention, wherein the parts are combined and arranged according to the best modes I have thus far devised for the practical application of the principles of my invention.

Figure 1 is a view, partly in section, showing one embodiment of my invention wherein a stationary finger and a rotary member co-operating therewith are applied to the open end glass for thinning its edges.

Figure 2 is a top plan view of the device of Figure 1 illustrating the means for adjusting the glass thinning device.

Figure 3 is a modified form of the device of Figure 1 wherein the finishing members are made hollow and provided with means for furnishing a blanket or film of steam to the material as it is being thinned for maintaining the proper temperature to the plastic glass.

Figure 4 is a further modification of the invention wherein two rollers or rotary members are employed for thinning the walls of the cylinder, here illustrated as a tumbler or glass.

For convenience of illustration I have indicated in the drawings a tumbler 1 which, as shown in Figure 1 of the drawings has previously been fashioned to the shape and form as shown in dotted lines as indicated at 2 in Figures 1 and 4, the form and shape having been applied thereto in usual or suitable manner. It will be noted that an inner, annular rib 3, indicated by dotted lines, has previously been formed by action of the finishing machine, not shown, and the walls of the open end cylinder or tumbler are to be thinned and this rib eliminated by action of the device of my invention, while the material is heated and in a plastic state.

In the form of the invention in Figure 1 the elements employed for this thinning process are indicated as a stationary finger 4 and a co-acting tapered roller 5, both composed of carbon, and each of these elements may be faced with a coating of composition material, if desired, to insure a smooth exterior surface. The inner working face 6 of the carbon finger is concaved as seen in Figure 2 to conform to the exterior surface of the glass, and this finger is attached to the supporting bar 7 by screws 8 passing through the carbon finger and into the metal bar. At its end said bar is fashioned with a socket head or sleeve 9 which is adjustable and retained by screw 10 on the straight stem 11, while this stem, by means of its socket head 12 and set screw 13, is adjustably held on the arm 14 of an elbow 15. As seen in Figure 2, the elbow 15 is provided with a socket head 16 and set screw 17 by means of which the elbow may be adjusted and held on the rod or bar 18 directly connected with the actuating part of the glass finishing machine, and by means of this connection the device of Figures 1 and 4 may be applied to or withdrawn from the glass as indicated. The stem, elbow, and rod are preferably of metal and are circular in cross section, to permit ready circumferential adjustment of the socket heads or longitudinal adjustment of these heads on their respective supporting members for varying the relation between the finger and roller.

The roller 5 is cored to receive the journal bearing sleeve 19 extending longitudinally therethrough and the roller through its sleeve may revolves on the journal 20 of the stem 21, nuts 22 being employed for retaining the roller in position.

In order that the roller may have a resilient contact with the inner face of the glass as the latter is carried through a circular path or revolved, the stem 21 is suspended from the arm 15 of the elbow by a socket head 23, integral with the stem. The stem may be held against longitudinal movement on the arm of the elbow by means of transverse keys 24 passing through openings in retaining collars 25 at the sides of the socket head 23, and these keys engage the periphery of the arm 15 of the elbow which may have an annular groove to accommodate the key.

The bar 7 and stem 21 are joined by means of a bolt 26 passing through openings in the respective members, and between the securing nuts 27 and a washer 28 adjacent the stem 21, a coiled spring 29 is interposed to exert its tension and urge the roller toward its complementary finger. The tension of course may be varied by operating the nuts and the relation of the roller and finger may thus be adjusted to secure the proper thickness of glass in the cylinder wall.

As before stated the glass 1 is revolved on its axis a required number of times and then revolved in reverse direction, with alternate movements and the finishing or thinning tool is applied to the wall of the revolving cylinder, with the roller on the inside as shown. The roller is maintained under proper tension by the spring 29 and held in contact with the inner face of the glass. The outer face of the glass passes over the curved or concave face 6 of the finger and the roller rolls over the inner face of the cylinder wall, thus thinning and smoothing the walls to such thickness as will be required to make an acceptable merchantable article.

In the form of the invention illustrated in Figure 3, the finger 4ª and roller 5ª are preferably made of metal as phosphor bronze, and hollow, in order that water may be fed to the interior of these members, and steam generated therein which may issue through the ports 30, 31, to form a heated blanket between the glass walls and the finger and between the roller and glass walls. The perforations are small and permit the passage of only sufficient vapor to insure a thin blanket or film for contact with the walls as they are being finished, and when the roller and finger are withdrawn from the glass they may be heated, as by electricity, gas, or other means for maintaining the proper temperature of these members to prevent sudden cooling of the glass walls. For it will be understood that the finger and roller should be maintained at a uniform temperature corresponding to that of the glass to which they are applied in order to prevent cracking of the glass.

In some instances the tool-head comprising the rod 18, elbow 14—15 and stud 11 may be utilized in connection with a pair of rollers 32 and 33, as in Figure 4, one at the outer side and the other at the inner side of the glass wall, and suspended on the stems 34 and 35 respectively. These stems and their rollers are held in adjusted position by the tension bolt 26, and because of the resiliency of the spring the relation of the rollers may be varied to adapt them for the required thickness of the glass wall.

Thus it will be apparent that by means of the device of my invention I am enabled to thin the walls of the glass and apply thereto a finish with uniformity and to accurately shape and form the finished walls. Various modifications are contemplated, and changes or alterations may be made, as for instance the roller and finger, or the two rollers may be automatically opened for withdrawal from the glass, and the pressure of the spring is automatically regulated to conform to the required thickness of the article.

Having thus fully described my invention, what I claim as new and desire to secure by Letters Patent is—

1. The combination in a glass finishing machine with a tool head comprising supporting members, of a pair of opposed finishing devices on said members adapted to engage the opposite faces of a revolving cylinder, positive means for varying the distance between said devices, and means carried by the tool head for generating a vapor for contact with a face of said cylinder.

2. The combination in a glass finishing machine with a tool head comprising supporting members, of a pair of opposed finishing devices one of which is rotary and supported on said members, means in connection with said head for adjusting the relation of said devices, a bolt connecting said members, and means on the bolt for holding said devices in contact with the opposite faces of a revolving cylinder.

3. The combination in a glass finishing device comprising opposed members and means for retaining said members in proper relation for engagement with the opposite faces of a cylinder, and means within said devices for generating a vapor for contact with the faces of said cylinder.

4. The combination in a glass finishing device comprising opposed members having hollow interiors, means for retaining said members in engagement with opposed faces of a glass, means for heating said members, and said members adapted to receive water for generation of steam, for the purpose described.

5. The combination in a glass finishing machine with a tool head comprising supporting members including an elbow, of a stud on said elbow, a finishing finger and finger bar on said stud, a stem loosely engaged on said elbow and a roller journaled on said stem for co-action with said finger, and a tension member between said stem and bar for holding said roller and finger in operative position.

6. The combination in a glass finishing machine with a tool head including a rod, an elbow and a stud on said elbow, of a concave finger and its bar and means for retaining said bar in adjusted position on the stud, a stem having a loose head on the elbow and means for retaining said head thereon, a roller journaled on the stem for co-action with said finger, a bolt passed through perforations in said bar and stem, and a spring on the bolt for holding said roller and finger in proper relationship.

AUGUSTUS H. HEISEY.